United States Patent [19]

Oboshi

[11] Patent Number: 4,704,184
[45] Date of Patent: Nov. 3, 1987

[54] APPARATUS IN THE FORM OF A DIE ASSEMBLY FOR BUILDING A LAMINATED CORE

[75] Inventor: Takamitsu Oboshi, Mizumaki, Japan

[73] Assignee: Mitsui High-Tec, Inc., Fukuoka, Japan

[21] Appl. No.: 699,834

[22] Filed: Feb. 8, 1985

[30] Foreign Application Priority Data

Feb. 10, 1984 [JP] Japan .................................. 59-23877

[51] Int. Cl.⁴ ............................................. B32B 31/04
[52] U.S. Cl. .................................... 156/512; 29/412; 156/264; 156/267
[58] Field of Search ....................... 156/264, 267, 512; 29/156.4 R, 412, 433; 277/235 B, 235 R

[56] References Cited

U.S. PATENT DOCUMENTS 2,547,941  4/1951  Heftler ................................... 29/412
4,285,754  8/1981  DiMatteo ............................ 156/267
4,300,273  11/1981 Lockhart ............................. 156/264

Primary Examiner—Caleb Weston
Attorney, Agent, or Firm—Handal & Morofsky

[57] ABSTRACT

An apparatus in the form of a die assembly for building a laminated core comprising a plurality of core sheets laminated one above another. Each of the core sheets has a plurality of caulking projections formed therein in the equally spaced relation which serve to achieve caulking between the adjacent core sheets. Prior to punching operation the blanking die is turned by a predetermined angle which is determined by a combination of gear ratio of the gearing mechanism and that of the indexing mechanism. A sprocket on the blanking die is operatively connected to a sprocket on the output shaft of the gearing mechanism and a sprocket on the input shaft of the gearing mechanism is operatively connected to a sprocket on the output shaft of the indexing mechanism. The latter includes a roller gear cam adapted to rotate at a constant rotational speed and a roller gear with a plurality of cam followers arranged in the equally relation around the roller cam so that rotation of the roller gear cam is intermittently transmitted to the roller gear. The input shaft on the roller cam gear is operatively connected to the crankshaft on press machine via endless timing belt so that rotation of the crankshaft is transmitted to the roller gear cam in the one to one relation.

8 Claims, 16 Drawing Figures

APPARATUS IN THE FORM OF A DIE ASSEMBLY FOR BUILDING A LAMINATED CORE

BACKGROUND OF THE INVENTION

1. Field of the Invention

The present invention relates to an apparatus in the form of a die assembly for building a laminated core and more particularly to improvement relating to a die assembly in which skewing and turn laminating are simultaneously carried out for automatically laminating a number of core sheets to build a laminated core for an electric motor.

2. Description of the Prior Art

Generally, a laminated core for an electric motor is produced using a hoop of magnetic steel plate by way of the steps of punching core sheets in one or more lines to a predetermined configuration and then successively laminating them one above another in the integrated structure. As is well know, a strip of steel plate does not have an uniform thickness as seen in the transverse direction due to bending of the rolls during the rolling operation. FIG. 1 is an exaggerated cross-sectional view of steel plate sectioned in the transverse direction. As is apparent from the drawing, it has a flattened trapezoidal cross-sectional configuration. For the same reason a hoop of steel plate which is prepared by slitting a strip of steel plate also has a trapezoidal cross-sectional configuration. Particularly, in the case of a hoop obtained from both the side parts PLa and PLb of a strip has remarkable fluctuation in thickness on both sides of the hoop. This tendency of increased fluctuation in thickness becomes more and more severe as the hoop has an increased width. When a laminated core is built by using core sheets having such trapezoidal cross-sectional configurations, there results a core with a trapezoidal cross-sectional configuration that is called banana shape (see FIG. 2).

To obviate this problem there has been proposed a method of laminating core sheets in such a manner as to cancel fluctuation in thickness (as disclosed in Japanese Patent Application No. 32486/1980). Specifically, in the proposed method oral punched core sheets are laminated one above another while they are turned by an angle of 180 degrees after completion of the punching operation of one core sheet in the blanking die which is arranged in the station where a hoop of steel plate is successively punched.

However, the prior method as mentioned above has drawback that inclined extension of slots in the laminated core that is called skew fails to be generated.

Further, as other typical prior methods there were proposed a method of mechanically turning the blanking die by a small angle by utilizing every stroke of the press machine (Japanese Patent Application No. 181232/1983) or turning the blanking die by a small angle by applying the number of pulses equal to required skew to a stepping motor so that skewing is achieved for the laminated core (Japanese Utility Model Laid-Open No. 10372/1980). However, the first-mentioned prior method still has the drawback that turn lamination fails to be carried out, whereas the last-mentioned prior method has drawbacks that it takes a long time to carry out feedback control to assure skew angle at high accuracy. Moreover, punching cannot be achieved at higher speed, although the prior method makes it possible to turn the blanking die by the rotation angle required for generating both turn lamination angle and skew angle.

For instance, in a case where skew angle is generated by means of stepping motor, that is, a case where the blanking die is turned, for instance, by an angle of 0.3 degree by one stroke of operation of the press machine, it is assumed that a stepping motor generating 400 pulses at every rotation by one revolution is employed at a speed reduction ratio of 1/90.

In this case the stepping motor has the following rotation angle.

$$0.3 \text{ degree} \times 90 = 27 \text{ degrees}$$

When it is assumed that the required number of pulses is $(27/360) \times 400 \fallingdotseq 30$, resolving capability amounts to 0.3 degree/30=0.01 degree in terms of angle and the average number of pulses is 500 pulses/second, it results that time required for rotation by one revolution amounts to 35/500=0.06 second/skew.

Further, when it is assumed that turn lamination angle is determined (for instance, 90 degrees) and the blanking die is turned for both turn laminating and skewing (by an angle of 0.3 degree), rotation time amounts to the following value.

$$9030/500 = 18.06 \text{ sec./(turn laminating+skewing)}$$

Thus, punching fails to be effected at higher speed. Even when the average number of pulses is increased by four times to reach 2000 pulses/second while maintaining a speed reduction ratio of 1/9, rotation time is reduced only to the following level.

$$903/2000 = 0.452 \text{ second/(turn laminating+skewing)}$$

Thus, punching is still carried out at lower speed and resolving capability is still held at a lower level of 0.1 degree.

On the contrary, there was recently proposed an apparatus for mechanically indexing turn lamination angle and electrically indexing rotation angle for generating skew angle (see Japanese Patent Application No. 183734/1984). The proposed prior apparatus is constructed such that the output shaft is rotated by a certain angle during rotation of the input shaft of the indexing mechanism to which rotation of the main spindle on press machine is transmitted, said certain angle (that is called cam indexing angle) being equal to turn lamination angle, and rotation of the output shaft is then transmitted to the differential gear mechanism, while output from the servomotor (or stepping motor) is transmitted to another input shaft of the differential gear mechanism via the speed reduction mechanism so that rotation is achieved by an angle equal to rotation angle required for generating skew angle. Owing to the arrangement that indexing of turn lamination angle is carried out in the mechanical way the servomotor is caused to operate with reduced load and moreover owing to the arrangement that the speed reduction mechanism is located behind the servomotor skew angle can be obtained at higher accuracy.

However, it is found that the prior apparatus can be adapted only to the maximum speed level of 300 SPM. Other drawbacks of the apparatus are that it is complicated in electrical system and moreover mechanical components constituting the apparatus are also complicated in structure, resulting in increased manufacturing cost.

SUMMARY OF THE INVENTION

Thus, the present invention has been made with the foregoing background in mind and its object resides in providing an improved apparatus in the form of a die assembly for building laminated core which assures that both turn laminating and skewing are carried out simultaneously.

It is other object of the invention to provide an improved apparatus of the above-mentioned type which is simple in structure and can be manufactured at an inexpensive cost.

To accomplish the above objects there is proposed according to the invention an apparatus in the form of a die assembly for building a laminated core comprising a plurality of core sheets by way of the steps of successively punching core sheets in the turnable blanking die, each of the core sheets having a plurality of caulking projections formed in the equally spaced relation around the periphery of a certain circle located coaxially relative to the core sheet, and carrying out caulking between the adjacent core sheets by means of the caulking projections, wherein the improvement further consists in that the apparatus includes a gearing mechanism which is interposed between an indexing mechanism adapted to operate within a predetermined range of phase angle at every rotation of its input shaft by one revolution to generate rotational output equal to the predetermined angle and a turnable blanking die, the indexing mechanism including the input shaft to which rotation of the crankshaft on press machine is transmitted, and wherein the gearing mechanism is adapted to transmit rotational output having the predetermined angle from the indexing mechanism to turn the blanking die by an angle of $(\phi+\theta)$, when it is assumed that a predetermined turn lamination angle equal to one pitch of the caulking projections or equal to plural pitches of the same is identified by $\phi$ and a rotational angle between the adjacent core sheets required to generate skew angle for the one core sheet is identified by $\pm\theta$.

According to a preferred embodiment of the invention the blanking die has a sprocket mounted thereon which is operatively connected to a sprocket on the output shaft of the gearing mechanism by way of a line of endless link chain.

Typically, the gearing mechanism includes an input gear, an intermediate gear and an output gear and a sprocket on the input shaft of the input shaft is operatively connected to a sprocket on the output shaft of the indexing mechanism.

The intermediate gear in the gearing mechanism usually includes two gear sections of which number of gear teeth is different from one another, the one of them meshing with the input gear and the other one meshing with the output gear.

Typically, the indexing mechanism includes a roller gear cam adapted to rotate at a constant rotational speed and a roller gear with a plurality of cam followers arranged in the equally spaced relation around the roller gear so that rotation of the roller gear cam is intermittently transmitted to the roller gear.

The input shaft on the roller cam gear is operatively connected to the crankshaft on press machine via a line of endless timing belt extending therebetween so that rotation of the latter is transmitted to the former in the one to one relation.

Turn angle of the blanking die is determined by gear ratio which is obtainable by a combination of gear ratio of the gearing mechanism and that of the indexing mechanism, the formed being multiplied by the latter.

Other objects, features and advantages of the invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to the accompanying drawings which illustrate preferred embodiments thereof.

Figure 1:
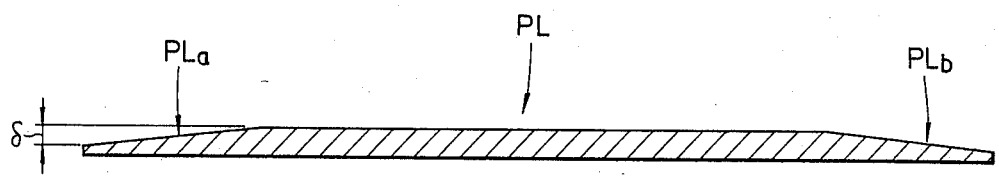
FIG. 1 is a cross-sectional view of a strip of magnetic steel plate from which a number of core sheets are successively punched for building laminated core.
Figure 2:
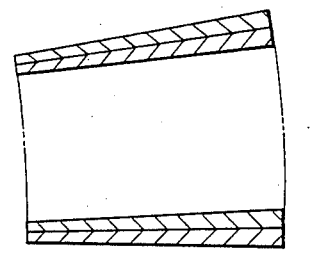
FIG. 2 is a fragmental cross-sectional view of a laminated core which is built by using only the one side part of a strip of steel plate.
Figure 3:
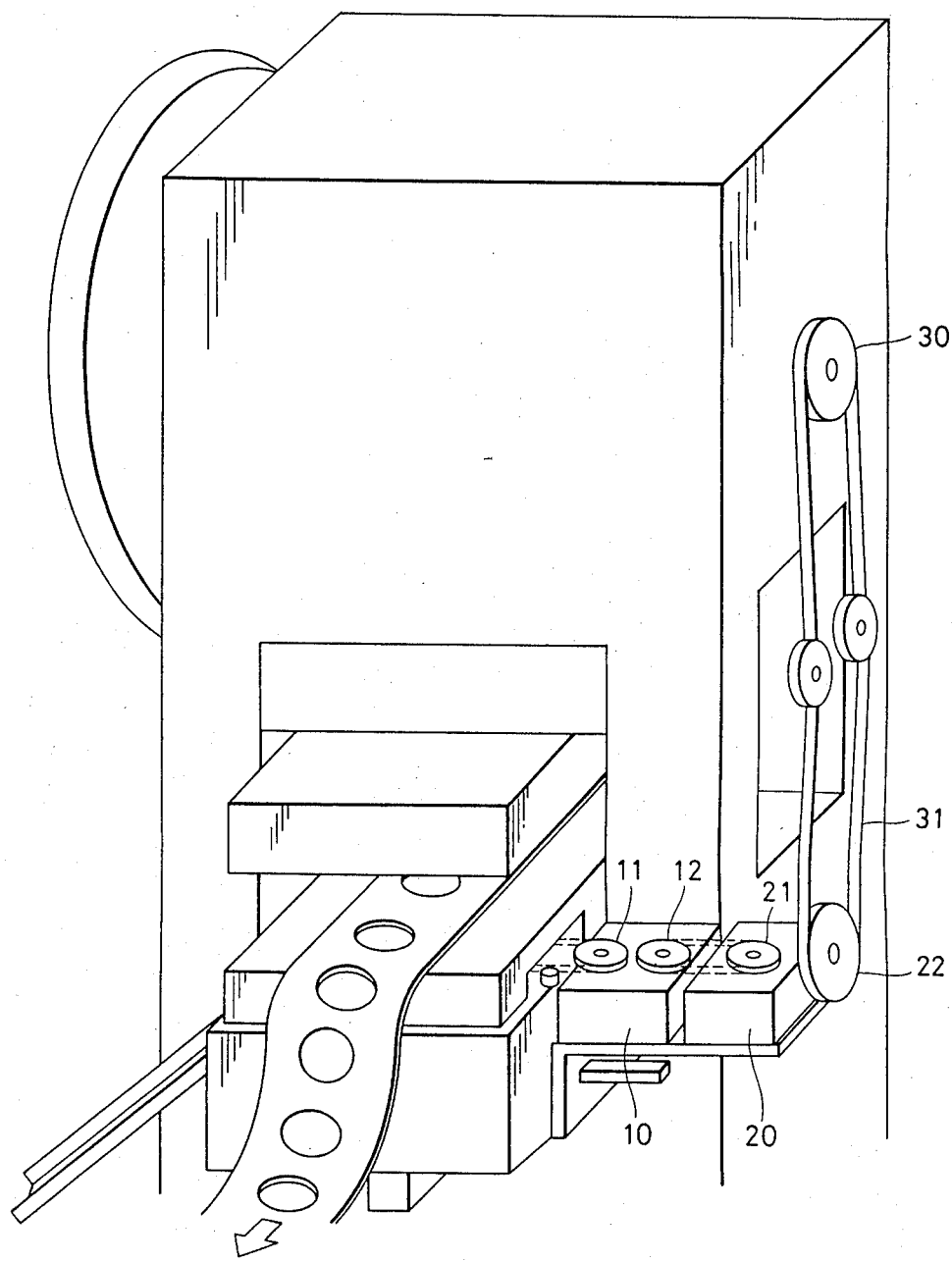
FIG. 3 is a perspective view a press machine in which the apparatus of the invention is incorporated.
Figure 4:
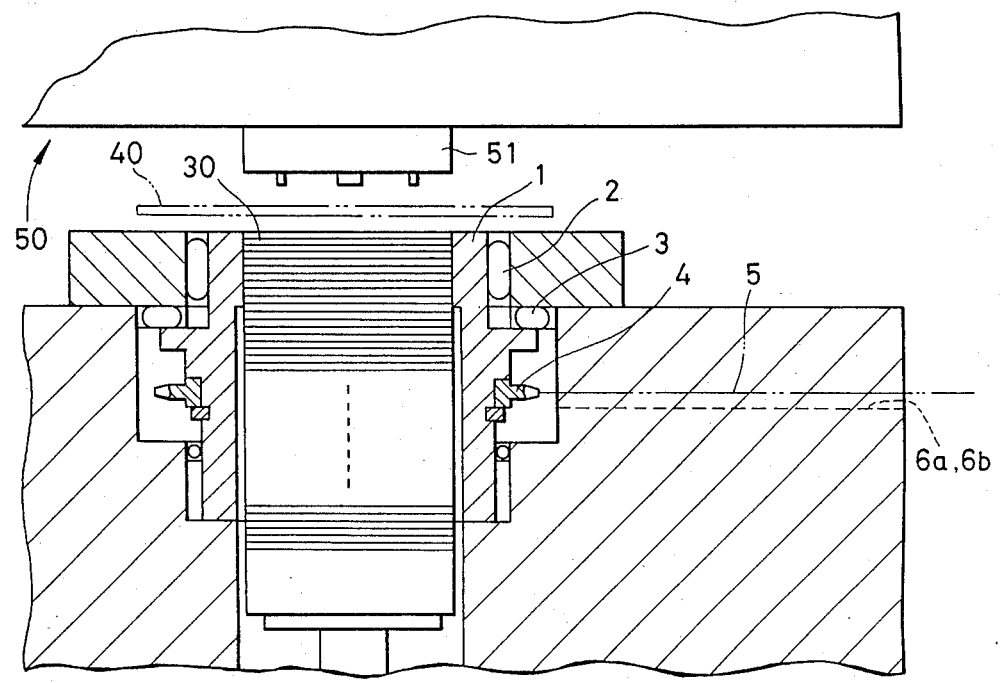
FIG. 4 is a vertical sectional view of the final station constituting the apparatus of the invention as illustrated in FIG. 4.
Figure 5:
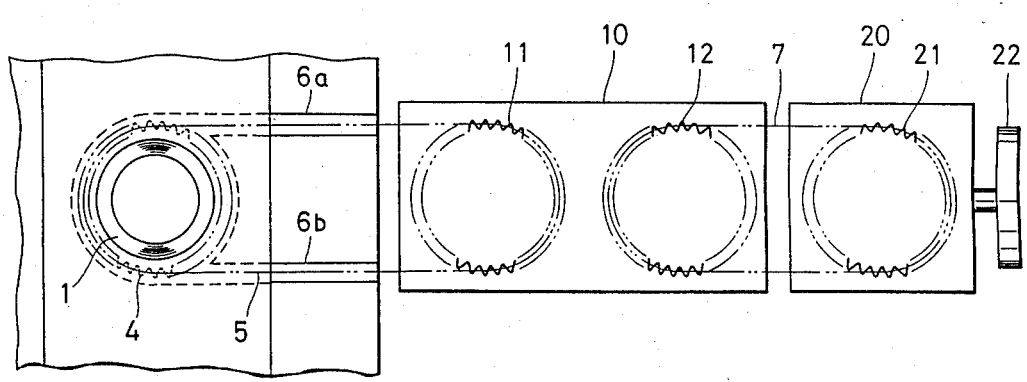
FIG. 5 is a fragmental plan view of the apparatus in FIG. 3, particularly illustrating an essential part thereof.

FIG. 3 is a perspective view illustrating an apparatus according to an embodiment of the invention and FIG. 4 is a fragmental vertical sectional view of the apparatus, particularly illustrating the structure of a station where punching, caulking, turn laminating and skewing are affected. Further, FIG. 5 is a fragmental plan view of the apparatus, particularly illustrating an essential part constituting the latter.

In the illustrated station a blanking die 1 (see FIG. 4) is adapted to turn with the use of bearings 2 and 3 and a sprocket 4 is mounted around the periphery of the blanking die 1. A line of endless link chain 5 is operatively engaged to the sprocket 4 and extends through grooves 6a and 6b in the apparatus to be operatively engaged to another sprocket 11 which is firmly fitted to an output shaft of the gearing mechanism 10 located outside the apparatus. The gearing mechanism 10 includes a sprocket 12 on the input shaft and the indexing mechanism 20 includes a sprocket 21 so that a line of endless link chain 7 is extended around both the sprockets 12 and 21. Further, the indexing mechanism 20 includes a timing belt pulley 22 which is mounted on the input shaft so that rotation of the crankshaft on press machine is transmitted thereto in the one to one relation. As is apparent from FIG. 3, the timing belt pulley 30 on the crankshaft has the same diameter as that of the timing belt pulley 22 on the indexing mechanism 20 whereby the former is operatively associated with the latter by way of a line of endless timing belt 31.

Figure 6:
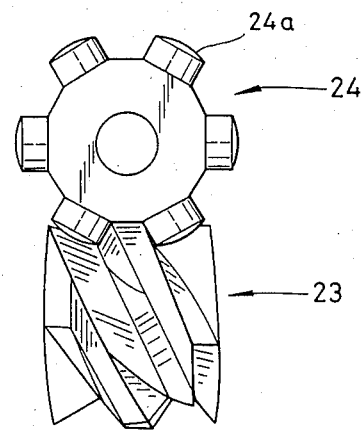
FIG. 6 is an exposed view of a indexing mechanism in the apparatus.

Specifically, the indexing mechanism 20 is intended to operate within a predetermined extent of phase angle in every rotation of the input shaft by one revolution (equal to rotation of the crankshaft by one revolution) in order to index a predetermined angle (one half, one third one forth and so forth of 360 degrees) and comprises two components, one of them being a roller gear cam 23 mounted on the input shaft and the other one being a roller gear 24 mounted on the output shaft, as illustrated in FIG. 6. The roller gear cam 23 is designed in the form of a cylindrical cam of which geometrical configuration is determined so as to generate intermittent movement, whereas the roller gear 24 includes a plurality of cam followers 24a which are arranged around the periphery in the equally spaced relation. Thus, the roller gear 24 is intermittently driven by means of the roller gear cam 23 adapted to rotate at a constant rotational speed.

Figure 7:
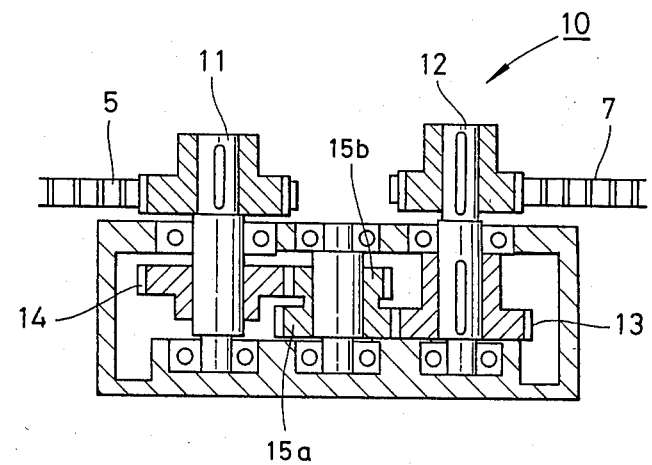
FIG. 7 is a vertical sectional view of a gearing mechanism in the apparatus.
Figure 8:
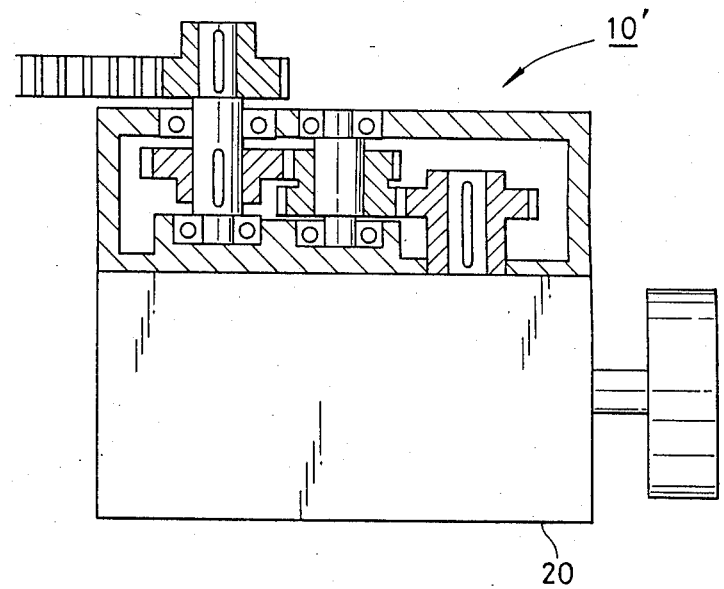
FIG. 8 is a vertical sectional view of the gearing mechanism in accordance with an embodiment modified from the preceding one.

As illustrated in FIG. 7, the gearing mechanism 10 includes an input gear 13 disposed coaxially relative to the sprocket 12, an output gear 14 disposed coaxially relative to the sprocket 13 and an intermediate gear 15 interposed between both the input and output gears 13 and 14. Incidentally, the intermediate gear 15 comprises gears 15a and 15b of which number of teeth is different from one another, wherein the gear 15a meshes with the input gear 13 and the gear 15b does with the output gear 14. As modification from the foregoing arrangement of the gearing mechanism the latter may be located above the indexing mechanism 20, as generally represented by reference numeral 10' in FIG. 8.

Thus, at every time when the crankshaft on press machine is rotated by one revolution, the indexing mechanism 20 is actuated within the predetermined extent of phase angle to generate rotational output equal to the predetermined angle. Thus generated rotational output is transmitted to the blanking die 1 via the gearing mechanism 10 which serves to increase or decrease rotational speed whereby the blanking die 1 is turned by a required angle.

Next, an example of laminated core to be worked in the station will be illustrated in the accompanying drawings and principle of operation of the apparatus will be described below.

Figure 9:
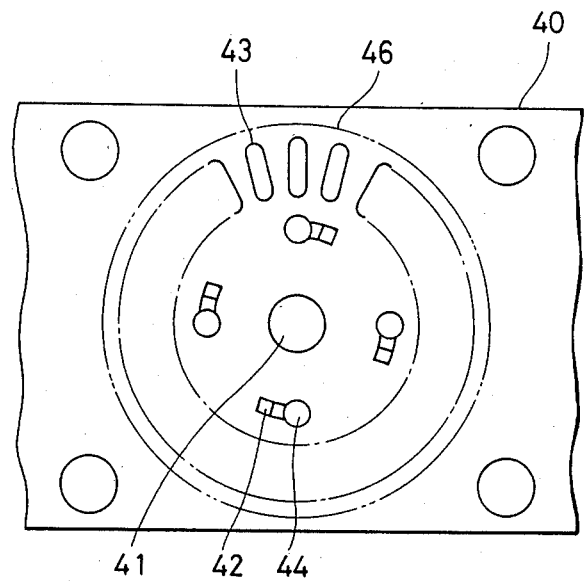
FIG. 9 is a fragmental plan view of a strip of magnetic steel plate which has arrived at the final station.
Figure 10:
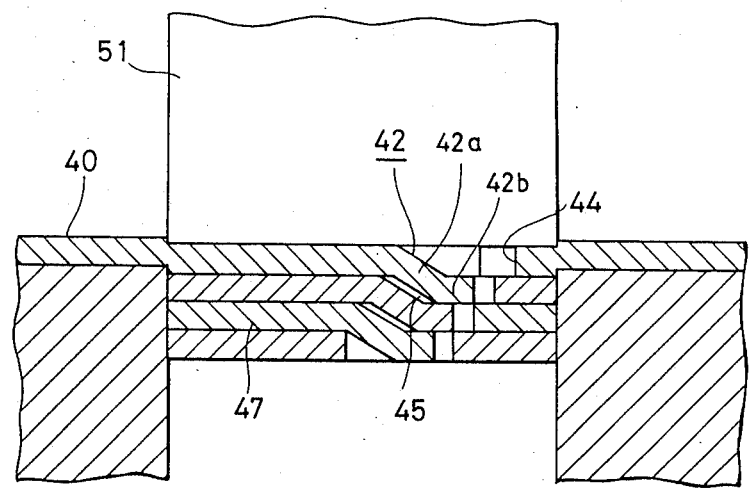
FIG. 10 is an enlarged vertical sectional view of the apparatus, particularly illustrating that core sheets are successively punched and they are then caulked to one another in the laminated state.
Figure 11:
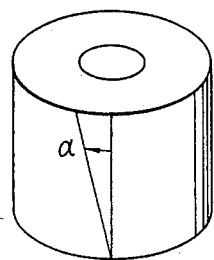
FIG. 11(a) is a perspective view of a laminated core which has a rightwardly turned skew angle.
FIG. 11(b) is a perspective view of a laminated core similar to FIG. 11(a), illustrating the case where it has a leftwardly turned skew angle.
Figure 11:
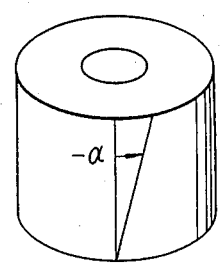

Part of a strip of steel plate 40 which has arrived at the station of the blanking die 1 is formed with a center shaft hole 41, a plurality of caulking projections 42, a number of slots 43 and a plurality of skew relief holes 44 as illustrated in FIG. 9 each of which is previously punched in a predetermined station located upstream of the station of the blanking die 1. As is apparent from FIGS. 9 and 11, each of the caulking projections 42 has the pawl-shaped geometrical configuration which is projected downwardly of the strip 40 by a predetermined distance and its base part constitutes an inclined portion 42a while its fore part does a horizontal portion 42b. The caulking projections 42 are formed by way of the steps of cutting and depressing and serve to achieve skewing and caulking. The foremost end of their horizontal portion 42b is located in alignment with the skew relief hole 44 and a hollow space 45 is built between the adjacent caulking projections 42. The hollow space 45 is in communication with the skew relief hole 44. When the strip 40 is pressed by means of a punch 51 of the upper die section 50 on the blanking die 1, it is punched in conformance with the circular track as identified by phantom lines 46 in FIG. 9 whereby a core sheet 47 to be laminated is produced in the cavity of the blanking die 1.

As illustrated in FIG. 9, the caulking projections 42 are arranged in the equally spaced relation along a circle disposed coaxially relative to the core sheet 47 and the slots 43 are located outwardly of the caulking projections 42 while maintaining the same positional relation therebetween. In the illustrated embodiment the core sheet 47 has four caulking projections 42 formed thereon. Thus, when the core sheet 47 is turned by an angle equal to one pitch of the caulking projections 42 (90 degrees) or by an angle equal to plural pitches of the caulking projections 42, the configuration of the core sheet 47 as seen from the above is kept unchanged, compared with that assumed before turning operation.

Accordingly, it is possible to laminate core sheets one above another in such a manner that one core sheet is turned away from the adjacent one by an angle equal to one pitch of the caulking projections or by an angle equal to plural pitches of the same exclusive 360 degrees. Lamination achieved in the turned state can cancel fluctuation in thickness of each of core sheets to be laminated. For the purpose of simplification of designation lamination to be achieved in the turned state will be hereinafter referred to as turn lamination and turn angle relative to turn lamination will be referred to also be referred to as turn lamination angle.

When lamination is carried out by turning one core sheet away from the adjacent one by a small amount of angle, inclined slots are built and thereby skewing takes place. Referring to FIGS. 11(a) and (b), an angle formed by generation line inclined due to rightward and leftward turn and normal generation line in parallel with the axis of laminated core will be hereinafter referred to as skew angle. Further, skew angle generated by rightward turn will be referred to as positive skew angle and skew angle generated by leftward turn will be referred to as negative skew angle.

Figure 12:
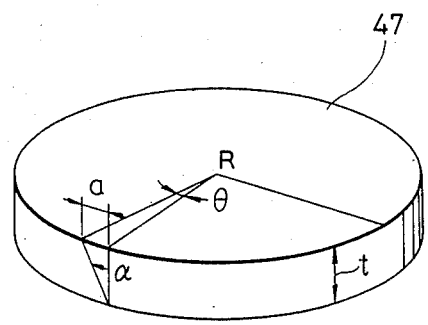
FIG. 12 is a fragmental perspective view of the laminated core, particularly illustrating rotational angle between the adjacent core sheets for generating a required skew angle.

Now, it is assumed that thickness of a core sheet 47 to be laminated is defined by t, radius of the same is by R and required skew angle is by $\alpha$, as illustrated in FIG. 12. Thus, angle $\theta$ required to turn each core sheet by a small amount of angle to generate skew angle α will be represented by the following formula.

$$\theta = \frac{360 \times a}{2\pi \times R} \quad (1)$$

where a=t×tan α and this reference letter designates a distance of displacement as measured along the periphery of core sheet.

When both turn lamination and skewing are carried out simultaneously, the blanking die1 is turned by an angle of φ±θ at every time when punching is effected. When it is assumed that turn lamination angle φ amounts to 120 degrees, the indexing mechanism 20 generates rotational output equal to 120 degrees at every rotation of crankshaft by one revolution, all the sprockets 4, 11, 12 and 21 have the same number of teeth and the gearing mechanism 10 has a gear ratio of 1, rotational output of the indexing mechanism 20 is transmitted to the sprocket 4 on the blanking die 1 in the one to one relation whereby the latter is turned by an angle of 120 degrees.

Thus, skew angle can be given to core sheet to be laminated by turning the blanking die 1 further by rotation angle θ.

Specifically, when the gearing mechanism 10 has a gear ratio G.R. as noted in the following, $$G.R. = \frac{120 + \theta}{120} \quad (2)$$

(in case of rightward turn)

$$G.R. = \frac{120 - \theta}{120} \quad (3)$$

rotation angle ±θ can be given to the blanking die 1.

In view of the fact that thickness t differs practically from core sheet to core sheet (due to manufacturing error) there is necessity for changing rotation angle θ in the strict sense. For instance, when it is assumed that radius R of core sheet to be laminated is dimensioned to 27.584 mm and skew angle α of the same is determined to 19, 20 or 21 degrees, rotation angle θ can be calculated with respect to thickness t of core sheet as shown on Table 1.

TABLE 1

| t(mm) | α 19° | α 20° | α 21° |
| --- | --- | --- | --- |
| 0.4191 | 0.2997° | 0.3168° | 0.3342° |
| 0.4318 | 0.3089° | 0.3265° | 0.3444° |
| 0.4445 | 0.3180° | 0.3361° | 0.3544° |
| 0.4572 | 0.3269° | 0.3456° | 0.3645° |

Further, required gear ratio G.R. can be obtained by putting rotation angle θ on Table 1 into the above-noted equations (2) and (3). The results are as shown on Tables 2 and 3.

TABLE 2

| t(mm) | α 19° | α 20° | α 21° |
| --- | --- | --- | --- |
| 0.4191 | 1.002498 | 1.002640 | 1.002785 |
| 0.4318 | 1.002574 | 1.002721 | 1.002870 |
| 0.4445 | 1.002650 | 1.002801 | 1.002953 |
| 0.4572 | 1.002724 | 1.002880 | 1.003038 |

TABLE 3

| t(mm) | α −19° | α −20° | α −21° |
| --- | --- | --- | --- |
| 0.4191 | 0.997503 | 0.997360 | 0.997215 |
| 0.4318 | 0.997426 | 0.997279 | 0.997130 |
| 0.4445 | 0.997350 | 0.997199 | 0.997047 |
| 0.4572 | 0.997276 | 0.997120 | 0.996963 |

Figure 13:
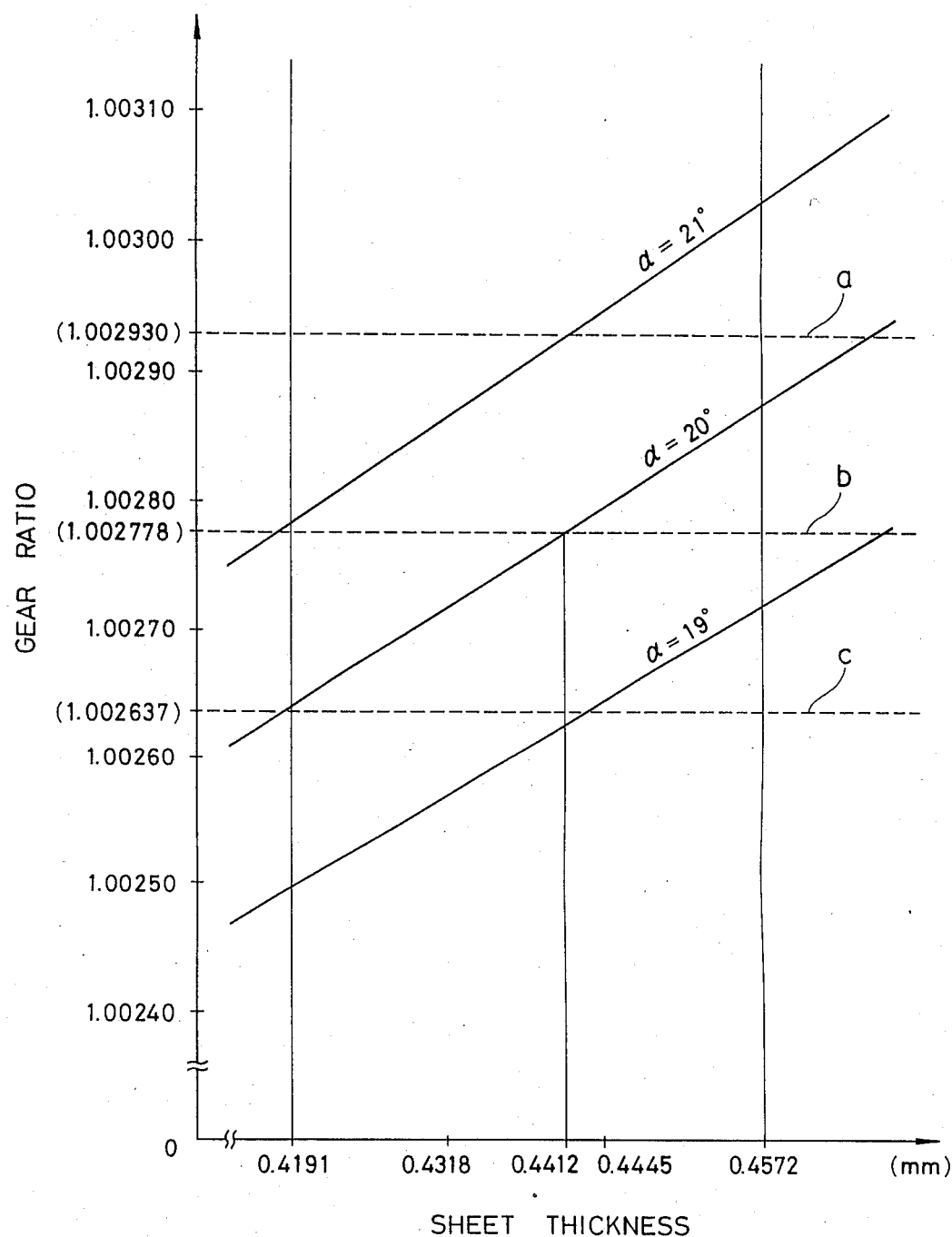
FIG. 13 is a graph illustrating the relation between thickness of core sheet to be laminated and number of gear teeth by using skew angle as parameter.
Figure 14:
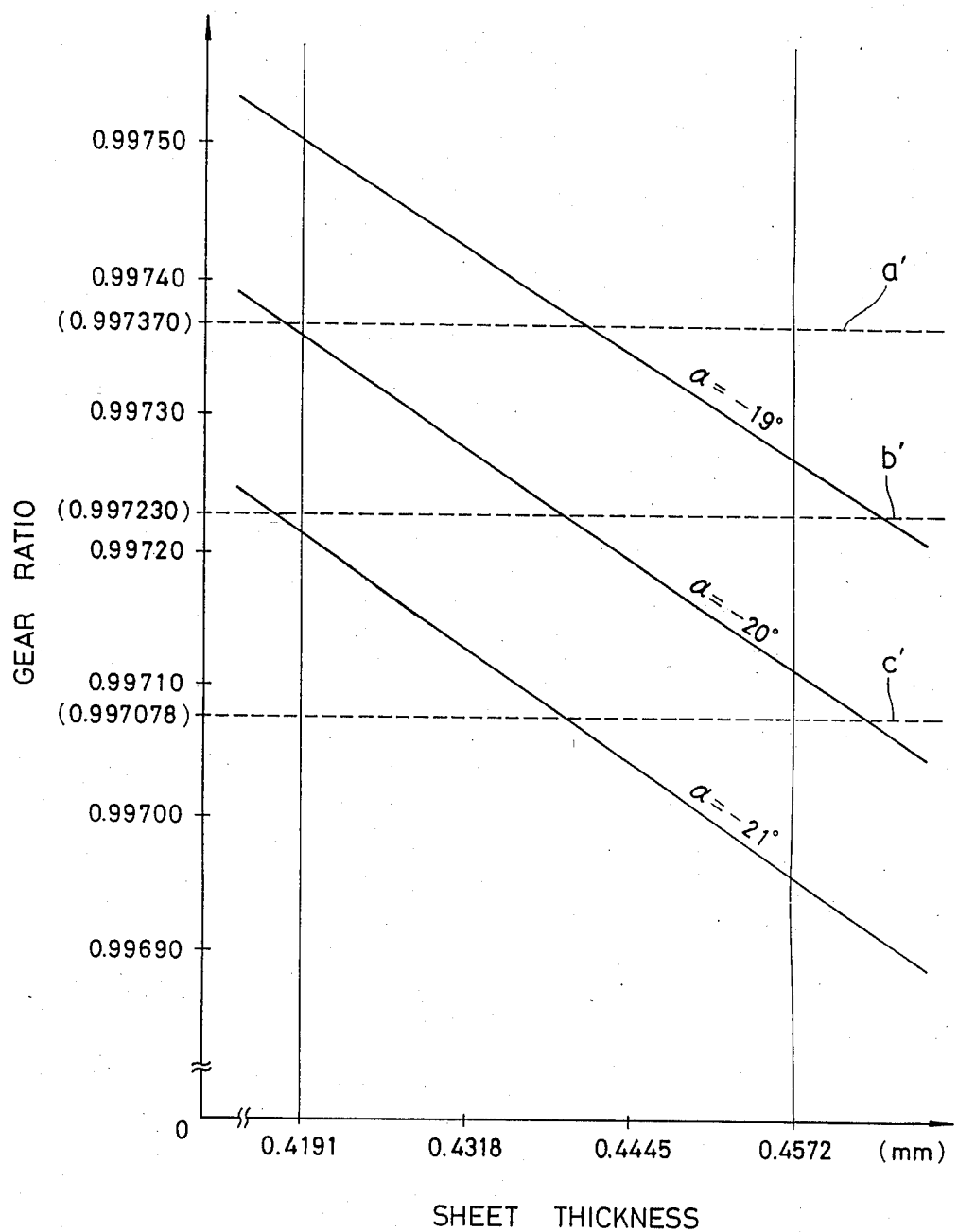
FIG. 14 is another graph similar to FIG. 13 illustrating the relation between thickness of core sheet and number of gear teeth by using skew angle as parameter.
Figure 15:
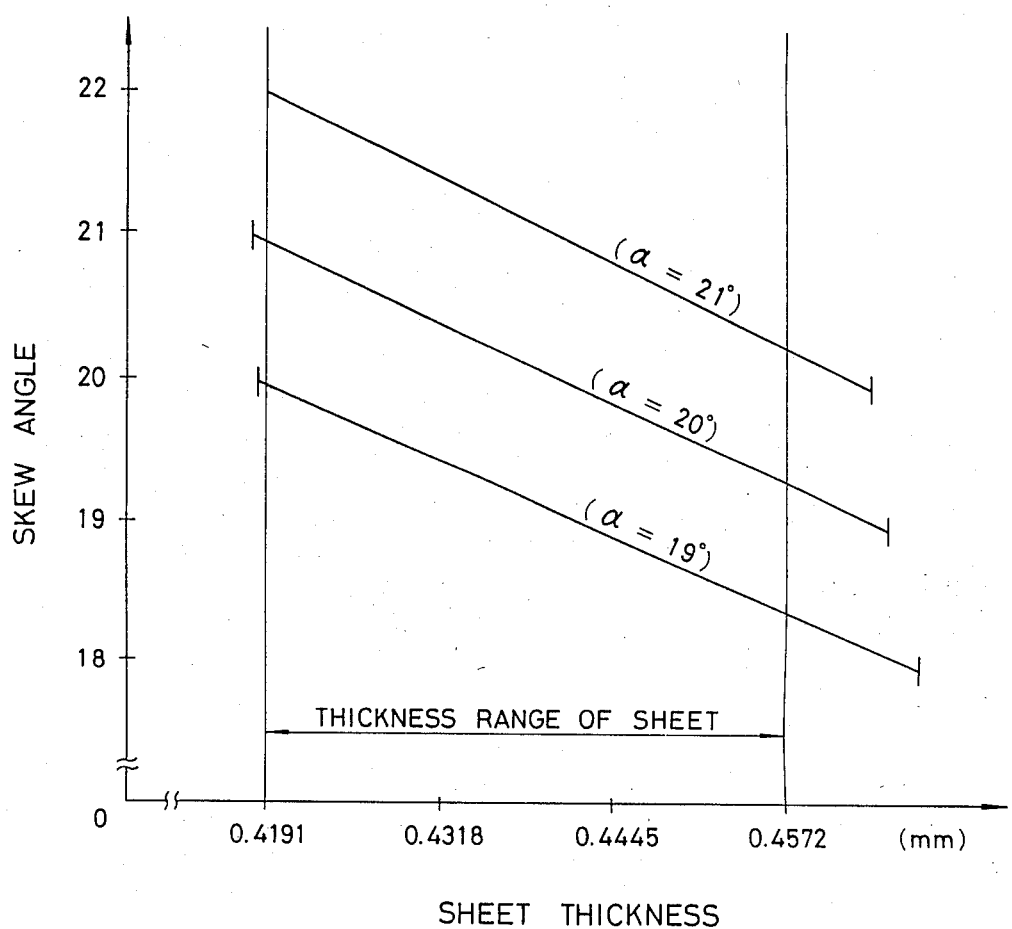
FIG. 15 is a graph illustrating the relation between thickness of core sheet and skew angle, wherein a permissible thickness range of core sheet is illustrated for three cases of skew angles of 19, 20 and 21 degrees.

Further, the relation between thickness of core sheet and gear ratio as shown on Tables 2 and 3 can be graphically represented as using skew angle as parameter. The results are as shown on FIGS. 13 and 14. It should be noted that the range of thickness which can be selectively determined with respect to each of skew angles α=19, 20 and 21 degrees is graphically shown on FIG. 15.

Skew angle has also a range of allowable error. Generally, allowable error is determined to ±1.0 degree. Thus, in case where preset skew angle is, for instance, 20 degrees, actual skew angle can be determined in the range of 19.0 to 21.0 degrees. Accordingly, when gear ratio is determined to 1.002778 as identified by a dotted line b on FIG. 13, the case of α=20 degrees is achieved when core sheet has a thickness of 0.4412 mm. On the other hand, when it has the miniumum thickness of 0.4191 mm, skew angle amounts to about 20.9 degrees and when it has the maximum thickness of 0.4572 mm, skew angle does to about 19.4 degrees. When judged from these results, it can be concluded that skew angle is satisfactorily maintained within the allowable range irrespective of how different sheet thickness is determined.

With respect to the case of α=21 degrees gear ratio (1.002930) as identified by a dotted line a may be taken and with respect to the case α=19 degrees gear ratio (1.002637) as identified by a dotted line c may be taken in the same way as the foregoing case.

Required gear ratios G.R. corresponding to the above-mentioned skew angles 19, 20 and 21 degrees can be obtained as noted below by properly determining the number of teeth of gears 13, 14, 15a and 15b in the gearing mechanism 10 (see FIG. 7).

$$G.R. = \frac{39}{41} \times \frac{39}{37} \simeq 1.002637 (\alpha = 19°) \quad (4)$$

$$G.R. = \frac{38}{40} \times \frac{38}{36} \simeq 1.002778 (\alpha = 20°) \quad (5)$$

$$G.R. = \frac{37}{39} \times \frac{37}{35} \simeq 1.002930 (\alpha = 21°) \quad (6)$$

Incidentally, the number of teeth of the gears 13, 14, 15a and 15b in the case of α=19 degrees are 39, 37, 41 and 39, as will be apparent from Formula (4).

On the other hand, in the case of leftwardly turned skew to be generated there is necessity for gear ratio as represented by Formula (3). However, in view of the fact that θ is very small compared with 120 degrees, Formula (3) can be modified to the following formula which is substantially equal to the first-mentioned one.

$$G.R. = \frac{120 - \theta}{120} \simeq \frac{120}{120 + \theta} \quad (7)$$

As is apparent from the above, Formula (7) is represented in the form of reciprocal of Formula (2) and this can be achieved merely by arranging combination of the above-described gears in the reverse manner to the first-mentioned combination (that is, using input shaft in the first-mentioned combination as output shaft and output shaft in the same as input shaft). Therefore, in the case of leftwardly turned skew gear ratios as identified by dotted lines a', b' and c' on FIG. 14 can be obtained by reciprocals of gear ratios as represented by Formulas (4) to (6).

As modification from the illustrated embodiment the gearing mechanism 10 may be constructed by a combination of one casing and three sets of gears adapted to be replaced in dependence on skew angle (selected from a group of 19, 20 and 21 degrees). However, this modified embodiment has a drawback that it is complicated in adjustment or the like operation. Another drawback is that due to the arrangement that center distance between the adjacent gears is kept constant regardless of different number of teeth of gears there is necessity for shifting the configuration of gears and changing their helical angle and therefore designing of the gearing mechanism 10 in that way is difficult to be achieved.

For the reasons as mentioned above it is preferable that three sets of gearing mechanisms are fabricated corresponding to three kinds of skew angles and center distance between both input and output shafts on each of the gearing mechanisms is determined constant in order that operative association with relevant sections (indexing mechanism 20, blanking die 1) is not changed any longer. Difference in number of teeth can be accommodated by dislocating the position of intermediate gear. Further, the geometrical configuration of casing should be preferably designed in the symmetrical relation so that the gearing mechanism is turned by an angle of 180 degrees in the case of leftwardly turned skew.

The present invention has been described above with respect to the case where turn lamination angle is determined to an angle of 120 degrees but it should not be limited only to this. It may be applied to the case where it is 90 degrees, 180 degrees or the like. Further, the present invention has been described above with respect to the case where core sheet is turned by a predetermined turn lamination angle by means of the indexing mechanism. Alternatively, the present invention may be embodied in such a manner that core sheet is turned by an angle of 180 degrees by operation of the indexing mechanism and the blanking die is then turned by an angle of 120 degrees $\pm \theta$. In this case gear ratio G.R. will be represented by the following formula.

$$G.R. = \frac{120 \pm \theta}{180} \qquad (8)$$

It should be noted that gearing mechanism should be arranged separately for both rightward and leftward turn.

In this embodiment all the sprockets 4, 11, 12 and 21 are designed to have the same diameter so that increase or decrease in rotational speed is not effected between the adjacent sprockets. Alternatively, the sprockets may have a diameter which is different from one another. In this case arrangement is made such that a product of gear ratio obtainable from a combination of sprockets multiplied by gear ratio relative to gearing mechanism becomes a required gear ratio. Thus, the apparatus of the invention may be constructed in any acceptable manner such that a gearing mechanism including gears, sprockets or the like means is interposed between the indexing mechanism and the blanking die in order to assure that the blanking die is turned by a rotation angle required for generating turn lamination angle and skew angle with the aid of a predetermined rotational output from the indexing mechanism.

As will be apparent from the above description, the apparatus of the invention has an advantageous feature that turn laminating and skewing are carried out simultaneously by means of gearing mechanism having a predetermined gear ratio which is interposed between the indexing mechanism and the blanking die. Another advantageous features of the apparatus are such that it is simple in structure, reliable in operation and easy to accommodate to necessity for changing skew angle.

What is claimed is:

1. In an apparatus comprising a turnable blanking die for use in a press machine for building a laminated core, which core comprises a plurality of core sheets, each of said core sheets having a plurality of projections formed in equally spaced relationship to each other around the periphery of a certain circle located coaxially relative to its respective core sheet, said projections serving to integrally couple adjacent core sheets, said apparatus comprising a turnable blanking die, and means for successively punching core sheets in said turnable blanking die and for integrally coupling the adjacent core sheets utilizing said projections, the improvement comprising gearing means, and an indexing mechanism coupled to said gearing means and adapted to operate within a predetermined range of phase angles for every rotation of its input shaft by one revolution to rotate an output shaft of said indexing mechanism by an amount equal to the predetermined angle, said indexing mechanism being driven by rotation of a crankshaft of the press machine, said gearing means being configured to transmit a rotational output having a predetermined angle to turn the blanking die by an angle of $(\phi \pm \theta)$, where $\phi$ is a predetermined turn lamination angle equal to one pitch of the projection or equal to plural pitches of the same and $\theta$ designates rotational angle between the adjacent core sheets required to generate skew angle for the one core sheet.

2. An apparatus as defined in claim 1, wherein the rotational angle $\theta$ is represented by the following formula, $$\theta = \frac{360 \times t \tan\alpha}{2\pi \times R}$$

where skew angle as measured on the cylindrical side wall of the laminated core is identified by $\alpha$, radius of the same by R and thickness of one core sheet by t.

3. An apparatus as defined in claim 1, wherein the gearing means comprising a first sprocket mounted on the output shaft of the indexing mechanism, a second sprocket mounted on the blanking die, and a gearing mechanism interposed between said first and second sprockets, an input shaft of said gearing mechanism being connected to said first sprocket by way of a first endless link chain, an output shaft of said gearing mechanism being connected to said first sprocket by way of a second endless link chain.

4. An apparatus as defined in claim 3, wherein the gearing mechanism includes an input gear, a third sprocket mounted on the shaft of the input gear, an intermediate gear and an output gear and a forth sprocket mounted on the shaft of the output gear.

5. An apparatus as defined in claim 4, wherein said intermediate gear comprises two gear sections and wherein the number of gear teeth of one of said gear sections is different from the number of gear teeth of the other of said gear sections, one of said gear sections meshing with the input gear and the other of said gear sections meshing with the output gear.

6. An apparatus as defined in claim 1, wherein the indexing mechanism includes a roller gear cam adapted to rotate at a constant rotational speed and a roller gear with a plurality of cam followers arranged in equally spaced relation around said roller gear so that rotation of the roller gear cam is intermittently transmitted to the roller gear.

7. An apparatus as defined in claim 6, wherein the input shaft of the indexing mechanism is operatively connected to the crankshaft of the press machine by way of a line of endless timing belt extending therebetween so that rotation of the latter is transmitted to the former in one to one relation.

8. An apparatus as defined in claim 1, wherein an angle of turning of the blanking die is determined by a gear ratio which is determined by multiplying the gear ratio of the gearing mechanism multiplied by the gear ratio of the indexing mechanism.

* * * * *